United States Patent
Kitani

(10) Patent No.: US 11,780,268 B2
(45) Date of Patent: Oct. 10, 2023

(54) TYRE

(71) Applicant: Sumitomo Rubber Industries, Ltd., Kobe (JP)

(72) Inventor: Naofumi Kitani, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 102 days.

(21) Appl. No.: 17/154,558

(22) Filed: Jan. 21, 2021

(65) Prior Publication Data

US 2021/0245550 A1   Aug. 12, 2021

(30) Foreign Application Priority Data

Feb. 6, 2020   (JP) .................. 2020-019007

(51) Int. Cl.
   *B60C 9/22*   (2006.01)
   *B60C 9/20*   (2006.01)

(52) U.S. Cl.
   CPC ........ *B60C 9/22* (2013.01); *B60C 2009/2016* (2013.01); *B60C 2009/2038* (2013.01)

(58) Field of Classification Search
   CPC . B60C 9/22; B60C 9/2204; B60C 2009/2219; B60C 2009/2223
   See application file for complete search history.

(56) References Cited

U.S. PATENT DOCUMENTS 3,554,261 A * 1/1971 Mirtain ............... B60C 13/02
                                               152/526
2014/0345766 A1   11/2014 Wang

FOREIGN PATENT DOCUMENTS

| EP | 0572906 A1 | | 12/1993 |
|---|---|---|---|
| EP | 719659 | * | 7/1996 |
| EP | 785096 | * | 7/1998 |
| EP | 1813444 A2 | | 8/2007 |
| EP | 2560829 | * | 5/2015 |
| FR | 1437569 | * | 5/1966 |
| JP | 2004-34907 | * | 2/2004 |
| JP | 2018-197075 | * | 12/2018 |
| WO | WO 2009/76970 | * | 6/2009 |
| WO | WO 2011/131419 A1 | | 10/2011 |
| WO | WO 2012017399 | * | 2/2012 |
| WO | WO 2013/021499 A1 | | 2/2013 |

(Continued)

OTHER PUBLICATIONS

Machine translation of EP 2560829, 2015.*

(Continued)

*Primary Examiner* — Justin R Fischer
(74) *Attorney, Agent, or Firm* — Birch, Stewart, Kolasch & Birch, LLP

(57) ABSTRACT

A tyre includes a tread portion being provided with a pair of shoulder circumferential grooves on an outer surface thereof and a tread reinforcing layer disposed in the tread portion. The tread reinforcing layer includes a circumferential belt layer having a plurality of first reinforcing cords oriented along a tyre circumferential direction. The circumferential belt layer includes a pair of axially spaced first circumferential belt plies extending in radially inner regions of the pair of shoulder circumferential grooves. The pair of first circumferential belt plies is arranged apart from one another at a distance L equal to or more than 20 mm in a tyre axial direction.

16 Claims, 6 Drawing Sheets

(56) References Cited

FOREIGN PATENT DOCUMENTS

WO   WO 2018/060796   *   4/2017
WO   WO 2017/208214 A1   12/2017

OTHER PUBLICATIONS

Machine translation of FR 1437569, 1996.*
Machine translation of JP 2004-34907, 2004.*
Machine translation of JP 2018-197075, 2018.*
Extended European Search Report, dated Jun. 1, 2021, for European Application No. 21154781.5.

* cited by examiner

TYRE

This application claims the benefit of foreign priority to Japanese Patent Application No. JP2020-019007, filed Feb. 6, 2020, which is incorporated by reference in its entirety.

BACKGROUND ART

Field of the Disclosure

The present disclosure relates to a tyre, and more specifically relates to a tyre for automobile.

Description of the Related Art

The following patent document discloses a pneumatic tyre comprising a belt layer that includes a circumferential reinforcing layer configured as a spirally wound wire.

PATENT DOCUMENT

[Patent document 1] WO2013/021499

SUMMARY OF THE DISCLOSURE

In general, due to driving, tyres are prone to deformation of a tread profile and a ground contact shape in the vicinity of circumferential grooves arranged on the outermost side in the tyre axial direction. This deformation tends to cause uneven wear of the land portion adjacent to the circumferential grooves.

The present invention has been made in view of the above circumstances and has a major object to provide a tyre capable of improving uneven wear resistance while preventing an increase in tyre mass.

In one aspect of the present disclosure, a tyre includes a tread portion being provided with a pair of shoulder circumferential grooves on an outer surface thereof and a tread reinforcing layer disposed in the tread portion, the tread reinforcing layer including a circumferential belt layer having a plurality of first reinforcing cords oriented along a tyre circumferential direction, the circumferential belt layer including a pair of axially spaced first circumferential belt plies extending in radially inner regions of the pair of shoulder circumferential grooves, and the pair of first circumferential belt plies being arranged apart from one another at a distance L equal to or more than 20 mm in a tyre axial direction.

In another aspect of the present disclosure, each length in the tyre axial direction of the pair of first circumferential belt plies may be smaller than the distance L.

In another aspect of the present disclosure, the tread portion may further be provided with one or more crown circumferential grooves between the pair of shoulder circumferential grooves, wherein each inner edge in the tyre axial direction of the pair of first circumferential belt plies may be located outwardly in the tyre axial direction of a respective one of the crown circumferential grooves.

In another aspect of the present disclosure, each of the pair of first circumferential belt plies may include an outer portion located outwardly in the tyre axial direction of a groove centerline position of a respective one of the pair of shoulder circumferential grooves, and an inner portion located inwardly in the tyre axial direction of the groove centerline position of a respective one of the pair of shoulder circumferential grooves, and a length A in the tyre axial direction of the outer portion may be smaller than a length B in the tyre axial direction of the inner portion.

In another aspect of the present disclosure, the tread portion may further be provided with one or more crown circumferential grooves between the pair of shoulder circumferential grooves, thereby the tread portion including a pair of shoulder land portions located outwardly in the tyre axial direction of the pair of shoulder circumferential grooves, and a pair of crown land portions located inwardly in the tyre axial direction of the pair of shoulder circumferential grooves, a ratio A/C of the length A in the tyre axial direction of each outer portion to a length C in the tyre axial direction of a respective one of the pair of shoulder land portions may be smaller than a ratio B/D of the length B in the tyre axial direction of each inner portion to a length D in the tyre axial direction of a respective one of the pair of crown land portions.

In another aspect of the present disclosure, the circumferential belt layer may further include a pair of axially spaced second circumferential belt plies that is superimposed on the pair of first circumferential belt plies.

In another aspect of the present disclosure, each of the pair of second circumferential belt plies may be located outwardly in the tyre axial direction with respect to a respective one of groove centerline positions of the pair of shoulder circumferential grooves.

In another aspect of the present disclosure, the tread reinforcing layer may further include an inclined belt layer including one or more inclined belt plies having a plurality of second reinforcing cords arranged at an inclination angle with respect to the tyre circumferential direction, and the pair of second circumferential belt plies may be superimposed on the pair of first circumferential belt plies via the one or more inclined belt plies.

In another aspect of the present disclosure, each of the pair of second circumferential belt plies may be formed by a turn-back portion turned back around at an outermost end in the tyre axial direction of a respective one of the pair of first circumferential belt plies.

In another aspect of the present disclosure, the tyre may be a heavy-duty vehicle tyre having an aspect ratio equal to or less than 65%.

In one aspect of the present disclosure, the tread portion may have a tread width equal to or more than 300 mm.

DESCRIPTION OF THE PREFERRED EMBODIMENTS

Figure 1:
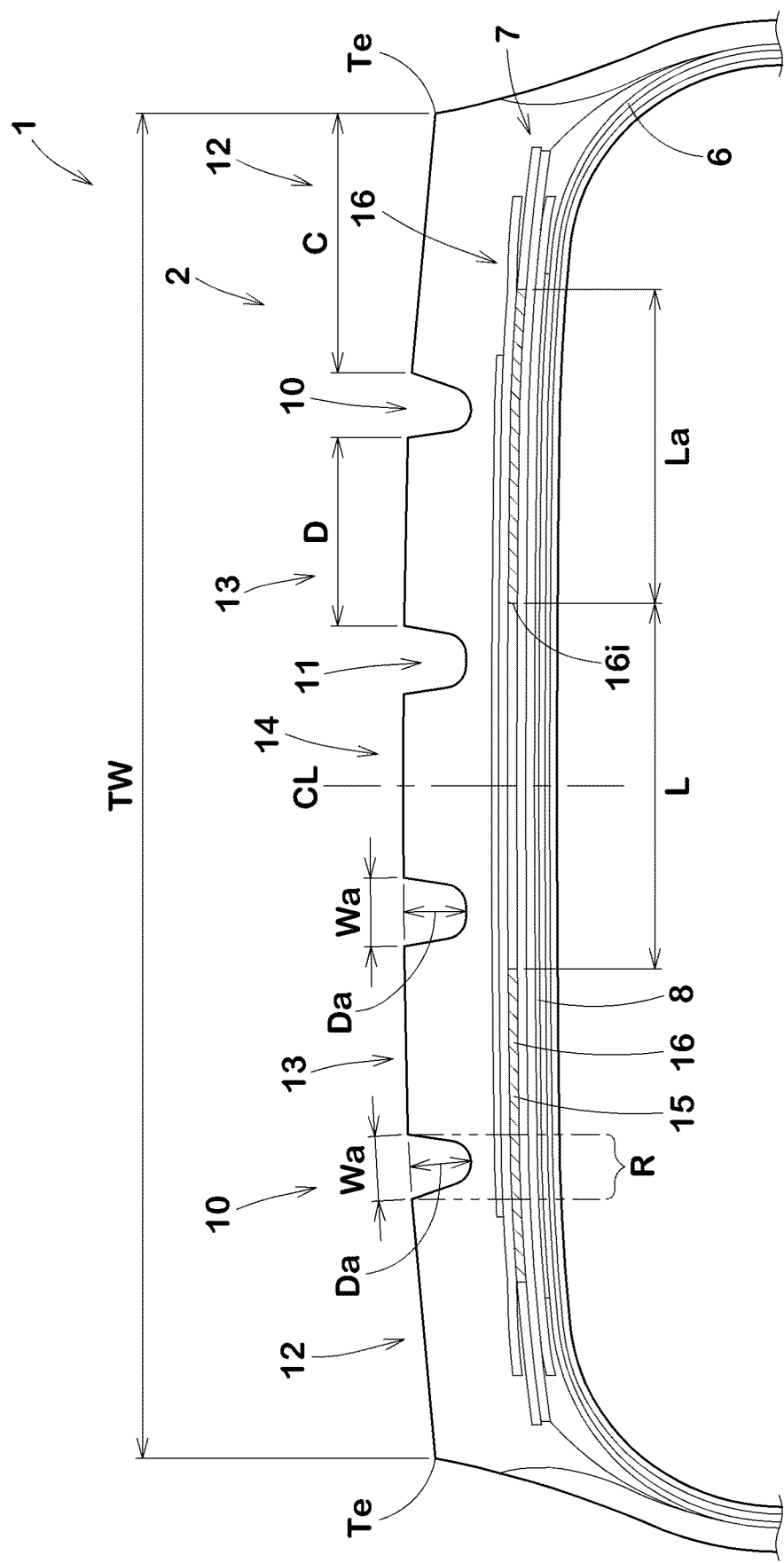
FIG. 1 is a cross-sectional view of a tread portion according to an embodiment of the present disclosure.

An embodiment of the present disclosure will be explained below with reference to the accompanying drawings.

Note that the same or like elements are denoted by the same reference numerals throughout the disclosure and detail explanations thereof are not repeated.

FIG. 1 is a cross-sectional view of a tread portion 2 of a tyre 1 under a normal state according to an embodiment of the present disclosure.

In FIG. 1, a pneumatic tyre for heavy duty vehicle is illustrated. Note that the present disclosure may be embodied as a pneumatic tyre for passenger car and motorcycle.

As used herein, the "normal state" is such that the tyre 1 is mounted onto a standard wheel rim (not illustrated) with a standard pressure but loaded with no tyre load. Unless otherwise noted, dimensions of portions of the tyre 1 are values measured under the normal state.

As used herein, the "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

Preferably, the tyre 1 has an aspect ratio equal to or less than 65%. In such a tyre 1, the width of the tread portion 2 (hereinafter simply referred to as "tread width") TW is formed large, and the contact pressure becomes small. As used herein, "aspect ratio" means the ratio of a cross-sectional height to a cross-sectional width of the tyre 1. The "cross-sectional width" is the maximum width in the tyre axial direction of the tyre 1 excluding patterns and characters on the side surfaces of the tyre 1. The "cross-sectional height" is ½ of the difference between the outer diameter of tyre 1 and the rim diameter of the standard wheel rim. The tread width TW is the width in the tyre axial direction between the tread edges Te and Te.

As used herein, the "tread edges" Te are the axial outermost edges of the ground contacting patch of the tyre 1 which occurs under a normal loaded condition such that the tyre under the normal state is grounded on a plane with a standard tyre load at zero camber angles. As used herein, the "standard tyre load" is a tyre load officially approved for each tyre by standards organizations in which the tyre is based, wherein the standard tyre load is the "maximum load capacity" in JATMA, the maximum value given in the above-mentioned table in TRA, and the "Load Capacity" in ETRTO, for example.

The tyre 1 may have the tread width TW equal to or more than 300 mm. Since such a tyre 1, which is a so-called wide single tyre, is mounted on a heavy-duty vehicle, high uneven wear resistance and reduction of tyre mass are desired.

As illustrated in FIG. 1, the tyre 1 according to the present embodiment includes a toroidal carcass 6, a tread reinforcing layer 7 disposed radially outwardly of the carcass 6 in the tread portion 2, and a cushion rubber layer 8 disposed between the carcass 6 and the tread reinforcing layer 7.

The tread reinforcing layer 7 includes a circumferential belt layer 15 having a plurality of first reinforcing cords 21 (shown in FIG. 2) oriented along the tyre circumferential direction.

The circumferential belt layer 15 includes a pair of axially spaced first circumferential belt plies 16. The pair of first circumferential belt plies 16 is located in a pair of radially inner regions R of a pair of shoulder circumferential grooves 10 provided on the tread portion 2. Such first circumferential belt plies 16 can suppress deformation of the tread profile near the shoulder circumferential grooves 10 of the tread portion 2 during running, and improves uneven wear resistance. Note that each inner region R is defined as a region between tyre radial lines that pass a pair of groove edges of a respective one of the shoulder circumferential grooves 10.

The pair of first circumferential belt plies 16 is arranged apart from one another at a distance L equal to or more than 20 mm in the tyre axial direction. As a result, an increase in tyre mass is suppressed. Thus, the tyre 1 of the present embodiment can improve uneven wear resistance while preventing an increase in tyre mass.

In the present embodiment, the tread portion 2 is further provided with one or more crown circumferential grooves 11 between the pair of shoulder circumferential grooves 10. In the present embodiment, two crown circumferential grooves 11 are provided such that each one is arranged between the tyre equator CL and a respective one of the pair of shoulder circumferential grooves 10. As to the crown circumferential grooves 11, it is not limited to such an aspect, but two crown circumferential grooves 11 may be provided between the tyre equator CL and a respective one of the pair of shoulder circumferential grooves 10, for example. Alternatively, three crown circumferential grooves 11 may be provided between the pair of shoulder circumferential grooves 10.

The shoulder circumferential grooves 10 and the crown circumferential grooves 11 extend continuously in the tyre circumferential direction. Alternatively, one or more of the shoulder circumferential grooves 10 and the crown circumferential grooves 11 may terminate in the tyre circumferential direction. The shoulder circumferential grooves 10 and the crown circumferential grooves 11 may extend in straight, zigzag, or wavy manner in the tyre circumferential direction. In the present embodiment, the shoulder circumferential grooves 10 and the crown circumferential grooves 11 have a groove width Wa in a range of from 5 to 20 mm and a groove depth Da in a range of from 10 to 20 mm.

The tread portion 2, in the present embodiment, includes a pair of shoulder land portions 12 disposed outwardly in the tyre axial direction of the pair of shoulder circumferential grooves 10, and a pair of crown land portions 13 disposed between the pair of shoulder circumferential grooves 10. The tread portion 2, for example further includes a central land portion 14 between the pair of crown land portions 13. The shoulder land portions 12, for example, are defined between the shoulder circumferential grooves 10 and the tread edges Te. The crown land portions 13, for example, are defined between the shoulder circumferential grooves 10 and the crown circumferential grooves 11.

Preferably, a width C in the tyre axial direction of each shoulder land portion 12 is equal to or more than 0.10 times the tread width TW, more preferably equal to or more than 0.15 times. Preferably, the width C of each shoulder land portion 12 is equal to or less than 0.30 times the tread width TW, more preferably equal to or less than 0.25 times. Preferably, a width D in the tyre axial direction of each crown land portion 13 is equal to or more than 0.05 times the tread width TW, more preferably equal to or more than 0.10 times. Preferably, the width D in the tyre axial direction of each crown land portion 13 is equal to or less than 0.25 times the tread width TW, more preferably equal to or less than 0.20 times. Thus, well stiffness balance of the shoulder land portions 12 and the crown land portions 13 can be obtained, preventing uneven wear on the respective land portions 12 and 13 effectively.

Figure 2:
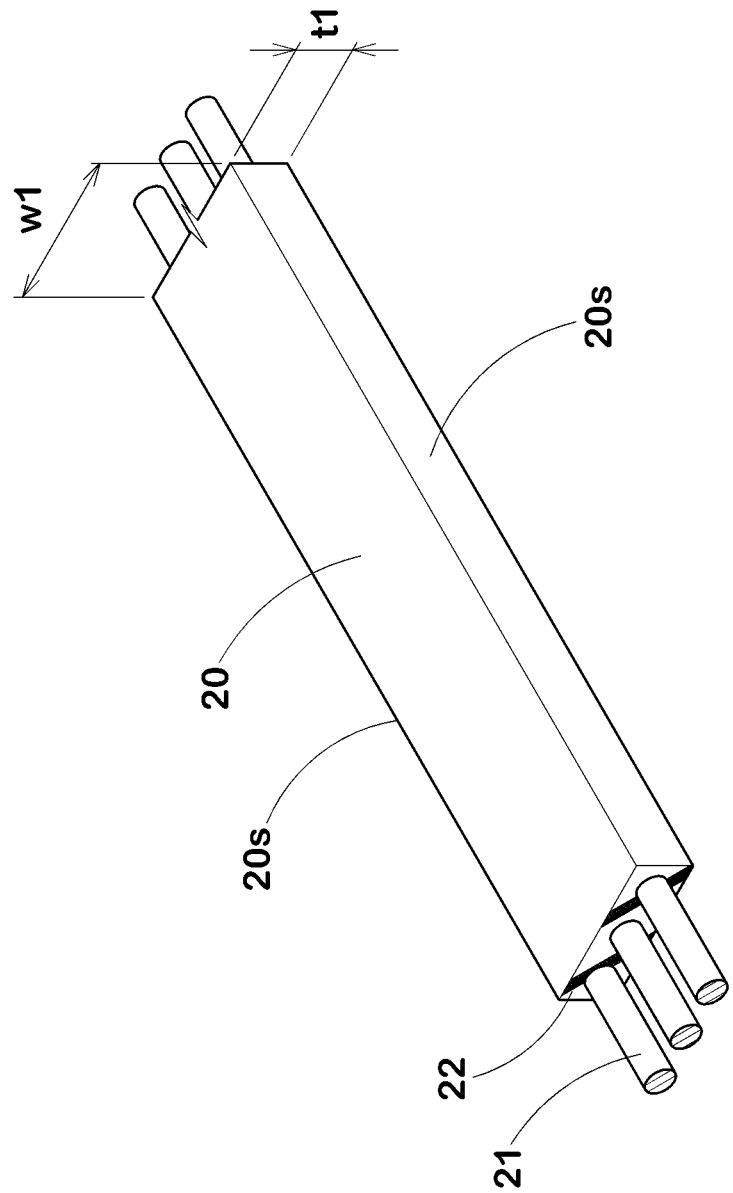
FIG. 2 is a perspective view of a ribbon shaped ply.

FIG. 2 illustrates a perspective view of a ribbon shaped ply 20. The circumferential belt layer 15 according to the present embodiment is formed by the ribbon shaped ply 20 which is spirally wound in the tyre circumferential direction.

As illustrated in FIG. 2, the ribbon shaped ply 20 includes one or more first reinforcing cords 21 which are coated with topping rubber 22. The first reinforcing cords 21 are oriented along the tyre circumferential direction, e.g., at an angle equal to or less than 5 degrees with respect to the tyre circumferential direction. Each first circumferential belt ply 16 has winding start and end of the respective ribbon shaped ply 20. A well-known forming method is adopted as the forming method of the circumferential belt layer 15.

As the first reinforcing cords 21, a steel cord is employed, for example. Note that from the viewpoint of reducing tyre mass, the first reinforcing cords 21 may be, for example, an organic fiber cord.

The ribbon shaped ply 20, for example includes a substantially rectangular cross-sectional shape having a pair of side surfaces 20s and 20s. Preferably, a width w1 of the ribbon shaped ply 20, for example, is in a range of from 2.5 to 12.0 mm. Preferably, a thickness t1 of the ribbon shaped ply 20, for example, is in a range of from 0.6 to 3.0 mm.

In the circumferential belt layer 15, for example, the ribbon shaped ply 20 is wound spirally such that the adjacent side surfaces 20s in the tyre axial direction of respective turns of the ribbon shaped ply 20 are in contact with each other. Alternatively, as the circumferential belt layer 15, the ribbon shaped ply 20 may be wound spirally such that the adjacent turns in the tyre axial direction of the ribbon shaped ply 20 overlap with each other.

As illustrated in FIG. 1, a length La in the tyre axial direction of each of the pair of first circumferential belt plies 16 is preferably smaller than the distance L. This makes it possible to reduce the tyre mass. Although not particularly limited, the length La of each first circumferential belt ply 16 is preferably equal to or less than 95% the distance L, more preferably equal to or less than 90%. In order to improve uneven wear resistance, the length La of each first circumferential belt ply 16 is equal to or more than 70% the distance L, more preferably equal to or more than 75%.

In order to improve the above effects in a well-balanced manner, the length La of each first circumferential belt ply 16 is preferably equal to or more than 0.15 times the tread width TW, more preferably equal to or more than 0.20 times. Further, the length La of each first circumferential belt ply 16 is preferably equal to or less than 0.35 times the tread width TW, more preferably equal to or less than 0.30 times.

In the present embodiment, in the vicinity of crown circumferential grooves 11, slippage during running is less likely to occur, and thus uneven wear is less likely to occur than in the vicinity of the shoulder circumferential grooves 10. Thus, in the present embodiment, inner ends 16i in the tyre axial direction of the first circumferential belt plies 16 are located outwardly in the tyre axial direction of the respective crown circumferential grooves 11. As a result, the tyre mass can be reduced while maintaining the improvement of uneven wear resistance.

Figure 3:
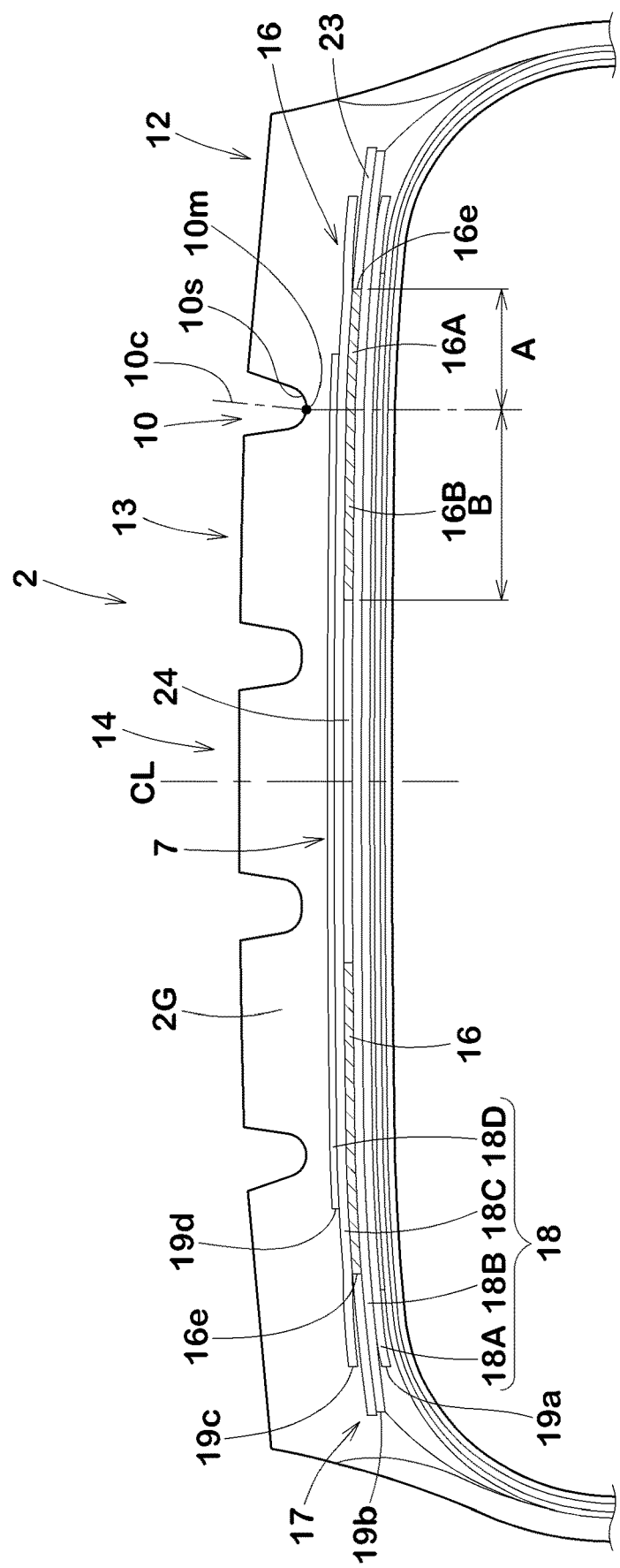
FIG. 3 is a cross-sectional view of the tread portion.

FIG. 3 is a cross-sectional view of the tread portion 2. As illustrated in FIG. 3, each of the pair of first circumferential belt plies 16 includes an outer portion 16A located outwardly in the tyre axial direction of a groove centerline position 10m of a respective one of the shoulder circumferential grooves 10, and an inner portion 16B located inwardly in the tyre axial direction of the groove centerline position 10m of a respective one of the shoulder circumferential grooves. In the present embodiment, a length A in the tyre axial direction of the outer portion 16A is smaller than a length B in the tyre axial direction of the inner portion 16B. Such first circumferential belt plies 16 can maintain a well balance between the rigidity of the land portions 13 and 14 between the shoulder circumferential grooves 10 and the rigidity of the shoulder land portions 12, preventing tread profile deformation on the land portions 12 to 14. Note that the groove centerline positions 10m are intersections of the groove centerlines 10c of the shoulder circumferential grooves 10 and the groove bottoms 10s thereof.

In order to effectively exert the above-mentioned effects, the length A of each outer portion 16A is preferably equal to or more than 55% the length B of a respective inner portion 16B, more preferably equal to or more than 60%. Further, the length A of each outer portion 16A is preferably equal to or less than 75% the length B of a respective inner portion 16B, more preferably equal to or less than 70%.

In the present embodiment, a ratio A/C of the length A in the tyre axial direction of each outer portion 16A to a length C in the tyre axial direction of a respective one of the shoulder land portions 12 is smaller than a ratio B/D of the length B in the tyre axial direction of each inner portion 16B to a length D in the tyre axial direction of a respective one of the crown land portions 13. In land portions around the shoulder circumferential grooves 10, a large ground pressure is applied axially inside than outside thereof, thus uneven wear is likely to occur on the inside land portion. Thus, by setting the ratio A/C smaller than the ratio B/D, in other words, setting the ratio B/D greater than the ratio A/C, stiffness of the crown land portions 13 is increased, and the uneven wear resistance is further improved.

Although not particularly limited, in order to further improve the above-mentioned effects, the ratio A/C of the length A of each outer portion 16A to the length C of a respective one of the shoulder land portions 12 is preferably equal to or more than 25%, more preferably equal to or more than 30%, for example. Further, the ratio A/C, for example, is preferably equal to or less than 45%, more preferably equal to or less than 40%. The ratio B/D, for example, is preferably equal to or more than 90%, more preferably equal to or more than 95%. Further, the ratio B/D, for example, is preferably equal to or less than 110%, more preferably equal to or less than 105%.

A reinforcing rubber 23 is arranged adjacent to an axially outermost end 16e in the tyre axial direction of each first circumferential belt ply 16. The reinforcing rubber 23, for example, is made of the same rubber composition as a tread rubber 2G located outside in the tyre radial direction of the tread reinforcing layer 7.

In the present embodiment, the tread reinforcing layer 7 further includes an inclined belt layer 17 including one or more inclined belt plies 18 having a plurality of second reinforcing cords (not illustrated) arranged at an inclination angle with respect to the tyre circumferential direction. Preferably, the inclined belt layer 17, for example, includes three to five inclined belt plies 18. In the present embodiment, the inclined belt plie 18 include four plies consisting of the first inclined belt ply 18A to the fourth inclined belt ply 18D which are superimposed in this order toward radially outwardly.

Each inclined belt ply 18, for example, includes the second reinforcing cords coated with a topping rubber which are oriented at an angle of from 10 to 35 degrees with respect to the tyre circumferential direction. Preferably, the inclined belt plies 18 are superimposed such that the second reinforcing cords of each ply cross with one another, for example.

In the present embodiment, the pair of first circumferential belt plies 16 is sandwiched between two adjacent inclined belt plies 18 of the inclined belt plies 18. As a result, deformation of the first circumferential belt plies 16 is suppressed, and uneven wear resistance can further be improved. The pair of first circumferential belt plies 16, for example, is located between the second the inclined belt ply 18B and the third inclined belt ply 18C.

The first, second and third inclined belt plies 18C have respectively outermost ends 19a, 19b and 19c in the tyre axial direction which are located outside in the tyre axial direction with respect to the outermost ends 16e in the tyre axial direction of the pair of first circumferential belt plies 16. Such a tyre 1 can enhance stiffness of the shoulder land portions 12. In addition, a pair of outermost ends 19d in the tyre axial direction of the fourth inclined belt ply 18D is located in the shoulder land portions 12 and inside in the tyre axial direction with respect to the outermost ends 16e of the pair of first circumferential belt plies 16. The fourth inclined belt ply 18D can further enhance stiffness of the shoulder land portions 12.

In the present embodiment, a rubber layer 24 is disposed between the pair of first circumferential belt plies 16 and 16. The rubber layer 24, for example, is made of the same rubber composition as the topping rubber 22 of the rubber layer 24. Alternatively, the third inclined belt ply 18C may be located in a space between the pair of first circumferential belt plies 16 instead of the rubber layer.

Figure 4:
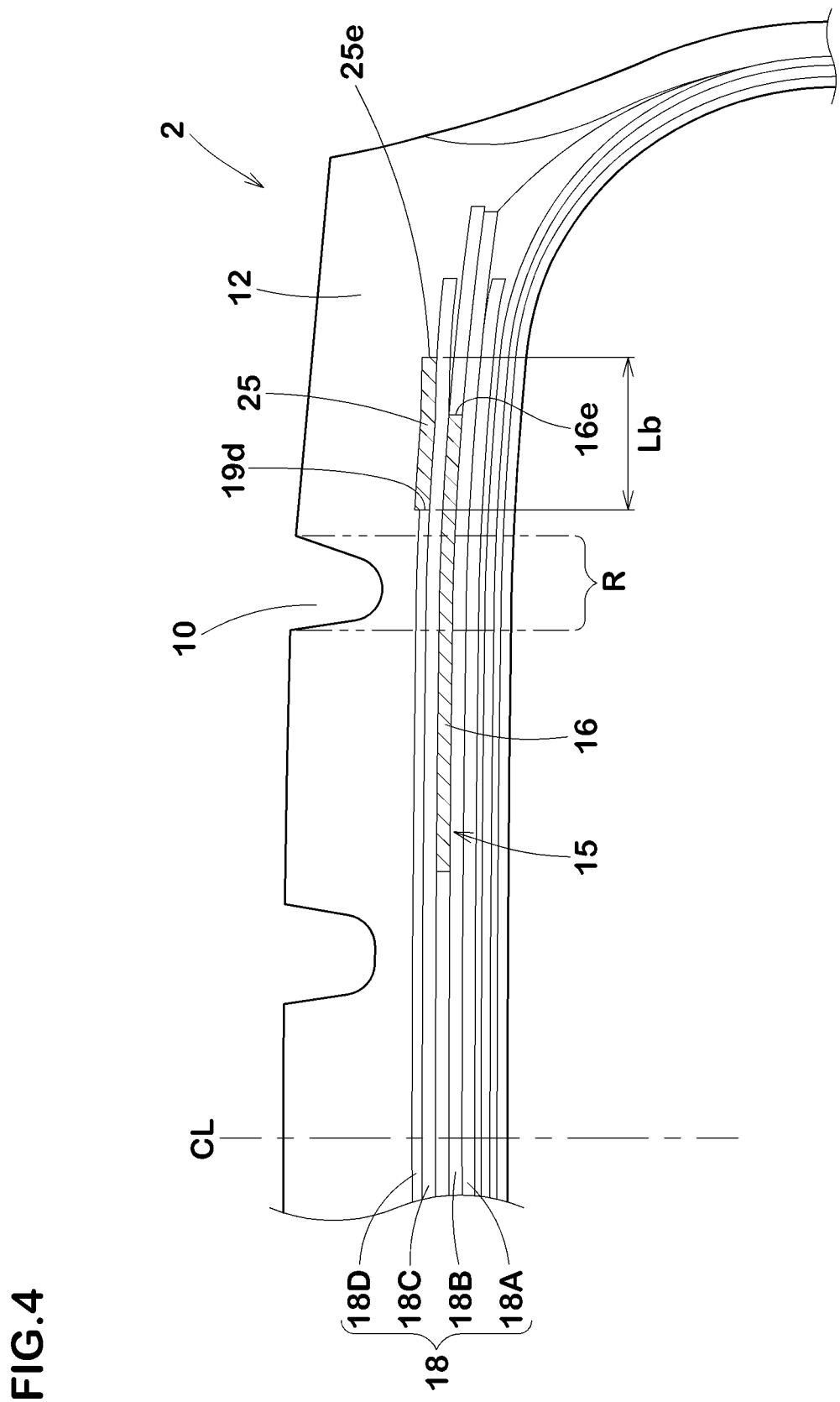
FIG. 4 is a cross-sectional view of the tread portion according to another embodiment.

FIG. 4 illustrates a cross-sectional view of the tread portion 2 according to another embodiment. As illustrated in FIG. 4, in this embodiment, the circumferential belt layer 15 further includes a pair of axially spaced second circumferential belt plies 25 that is superimposed on the pair of first circumferential belt plies 16. Such a pair of second circumferential belt plies 25 can enhance stiffness of the shoulder land portions 12.

The pair of second circumferential belt plies 25, in this embodiment, is arranged outwardly in the tyre axial direction of the inner regions R of the pair of shoulder circumferential grooves 10. Such a pair of second circumferential belt plies 25 can also suppress shoulder wear of the shoulder land portions 12, and the second circumferential belt plies 25 can suppress increase in tyre mass.

The second circumferential belt plies 25, for example, are superimposed on the first circumferential belt plies 16 via one or more inclined belt plies 18. The second circumferential belt plies 25, in this embodiment, are superimposed on the first circumferential belt plies 16 via the third inclined belt ply 18C. Thus, the second circumferential belt plies 25 of this embodiment is indirectly superimposed on the first circumferential belt plies 16.

The second circumferential belt plies 25 are arranged so as to be connected to outermost ends 19d in the tyre axial direction of the fourth inclined belt ply 18D. The second circumferential belt plies 25, for example, are disposed on the third inclined belt ply 18C.

Each second circumferential belt ply 25 has an outermost end 25e in the tyre axial direction which is located outside in the tyre axial direction of the outermost end 16e in the tyre axial direction of a respective one of the first circumferential belt plies 16. As a result, stiffness of the shoulder land portions 12 can further be increased.

Although not particularly limited, a length Lb in the tyre axial direction of the second circumferential belt plies 25 is preferably equal to or more than 0.30 times the length C of the shoulder land portions 12, more preferably equal to or more than 0.35 times. Further, the length Lb of the second circumferential belt plies 25 is preferably equal to or less than 0.50 times the length C of the shoulder land portions 12, more preferably equal to or less than 0.45 times.

Figure 5:
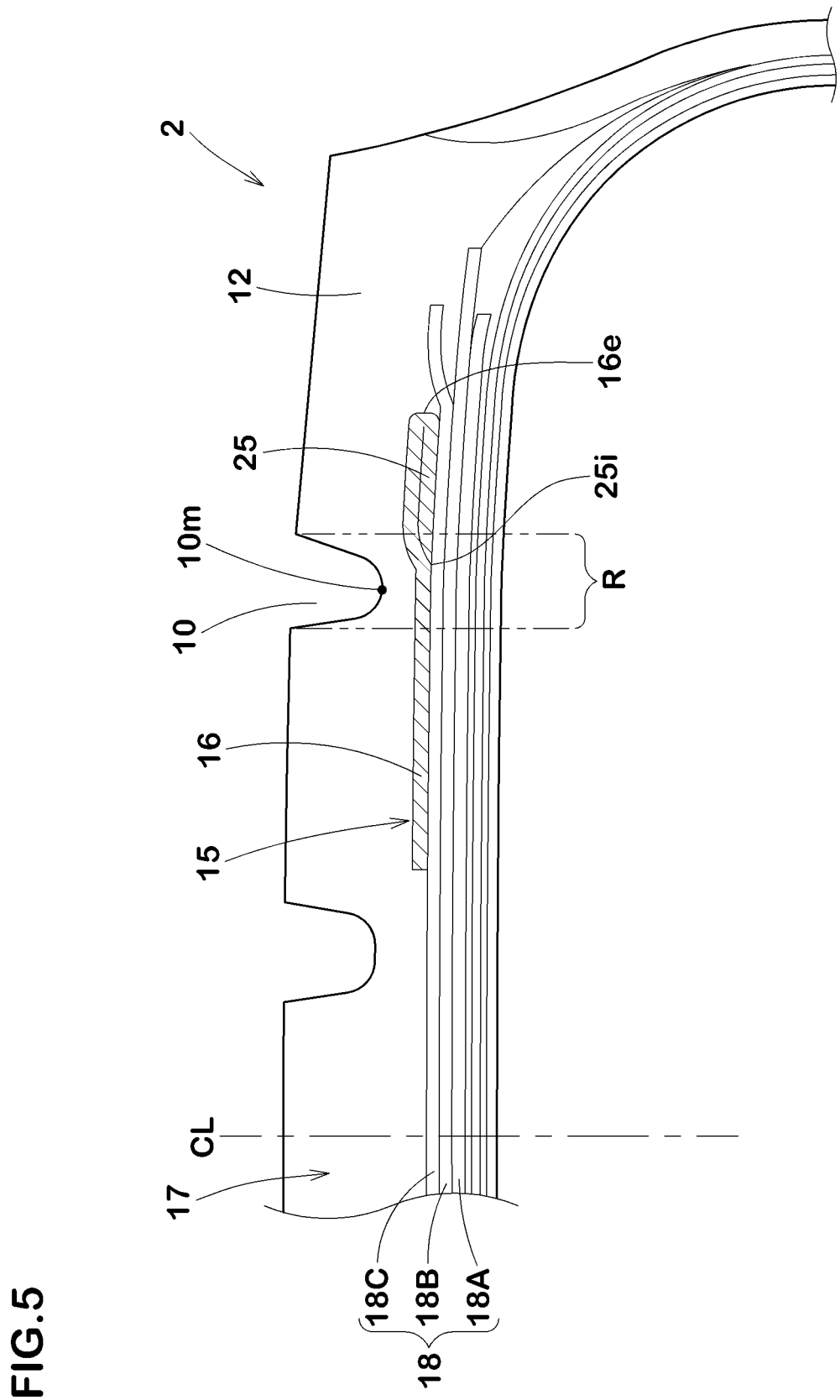
FIG. 5 is a cross-sectional view of the tread portion according to yet another embodiment.

FIG. 5 illustrates a cross-sectional view of the tread portion according to yet another embodiment. As illustrated in FIG. 5, in this embodiment, each of the pair of second circumferential belt plies 25 is formed by a turn-back portion turned back around at an outermost end 16e in the tyre axial direction of a respective one of the pair of first circumferential belt plies 16. Thus, the second circumferential belt plies 25 according to this embodiment are connected to the first circumferential belt plies 16 directly.

In this embodiment, the second circumferential belt plies 25 is located inwardly in the tyre radial direction of the first circumferential belt plies 16. The second circumferential belt plies 25 are not particularly limited but may be located outwardly in the tyre radial direction of the first circumferential belt plies 16, for example.

The second circumferential belt plies 25 each have an innermost end 25i in the tyre axial direction which is located within the inner region R of a respective one of the shoulder circumferential grooves 10, for example. Thus, deformation of a tread profile around the shoulder circumferential grooves 10 can be prevented effectively. In this embodiment, the innermost end 25i of each second circumferential belt ply 25 is located outside in the tyre axial direction of the groove centerline position 10m of the corresponding shoulder circumferential groove 10. This can suppress an increase in tyre mass.

In this embodiment, the inclined belt layer 17 consists of the first to third inclined belt plies 18A to 18C, and the third inclined belt ply 18C is arranged radially outermost in the inclined belt layer 17. The first circumferential belt plies 16 and the second circumferential belt plies 25 are arranged outside in the tyre radial direction of the third inclined belt ply 18C.

Figure 6:
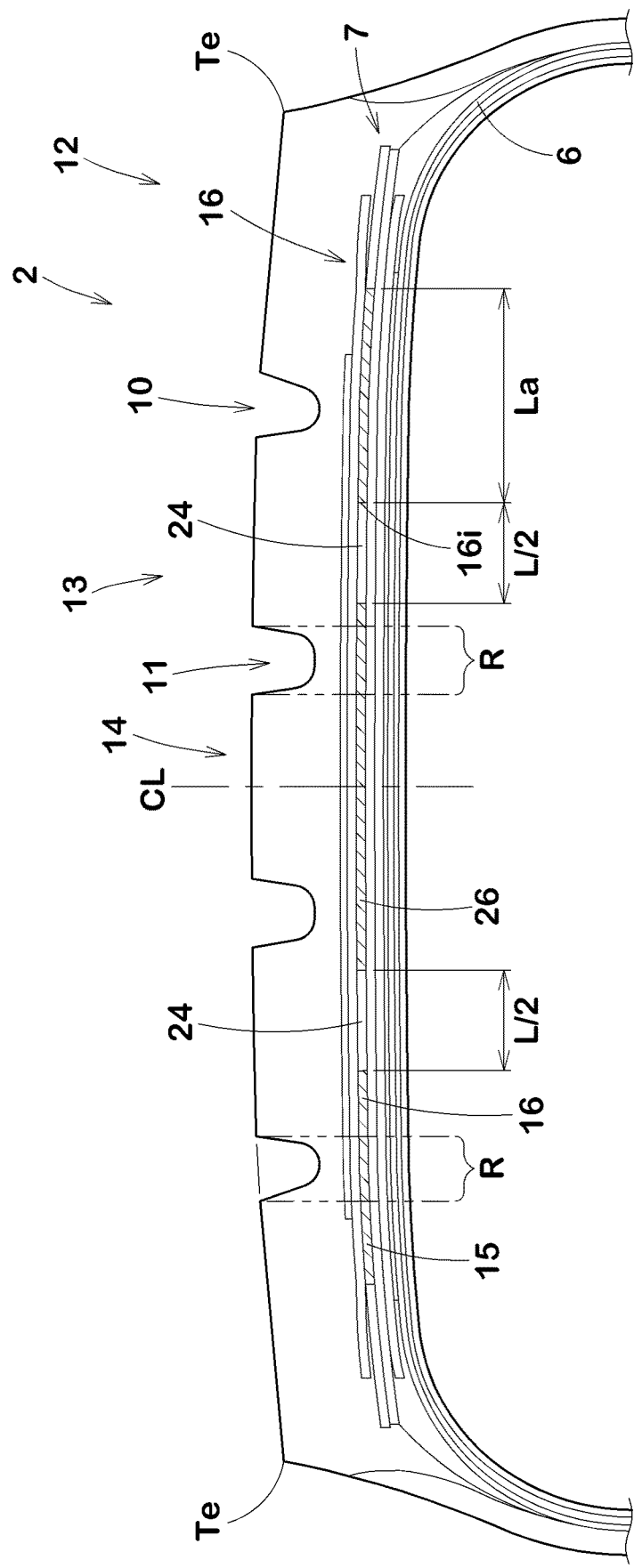
FIG. 6 is a cross-sectional view of the tread portion according to still yet another embodiment.

FIG. 6 illustrates a cross-sectional view of the tread portion according to still yet another embodiment. As illustrated in FIG. 6, in this embodiment, the circumferential belt layer 15 includes the pair of first circumferential belt plies 16, and a central belt ply 26 arranged between the pair of first circumferential belt plies 16. In this embodiment, a distance L/2 between the central belt ply 26 and a respective one of the first circumferential belt plies 16 is equal to or more than 10 mm. The central belt ply 26, in this embodiment, extends in radially inner regions R of the crown circumferential grooves 11.

Although some preferred embodiments of the present disclosure have been described in detail above, the present disclosure is not limited to the above-mentioned specific disclosure, but can be modified various aspects within the scope of the claims.

EXAMPLE

Heavy duty pneumatic tyres having the tread portion of FIG. 1 were prototyped based on the specification shown in Tables 1 and 2. Then, these tyres were tested for profile maintenance performance, uneven wear resistance and tyre mass. The common specifications and test methods for each tyre are as follows. In Table 2, the tyres have the same structure as with one another except for the arrangement of the first circumferential belt plies.

Tyre size: 355/50R22.5
Circumferential groove width: 13.5 mm
Profile Maintenance Performance Test:
After running each test tyre for 1000 km with a conventional inside drum tester, the amount of change (mm) in the tyre radial direction at the bottom of the shoulder circumferential grooves was measured. The test results are shown as follows, based on the amount of change (mm), wherein the larger the number, the better.
 less than 0.5 mm: 100
 0.5 mm or more and less than 1.0 mm: 95
 1.0 mm or more and less than 1.5 mm: 90
 1.5 mm or more and less than 2.0 mm: 85
 2.0 mm or more and less than 2.5 mm: 80

Uneven Wear Resistance Test:

After running each test tyre for 10,000 km on the above-mentioned drum tester, the occurrence of shoulder drop wear of each land portion was visually evaluated by a tester. The test results are shown using a score in Table 1 with Example 1 as 100 and in Table 2 with Example 9 as 100. The larger the number, the better.

Tyre Mass Test:

The mass of each sample tyre was measured, and the results are displayed as follows:

3 points that are lighter than the tyre mass of Ref 2 by more than 2 kg, 2 points that are lighter than the tyre mass of Ref. 2 by 1 to 2 kg, 1 point is shown as one that is 1 kg or less and lighter than the tyre mass of Ref 2. Two or more points are desirable.

The test results are shown in Tables 1 and 2.

TABLE 1

|  | Ref. 1 | Ref. 2 | Ex. 1 | Ex. 2 | Ex. 3 | Ex. 4 | Ex. 5 | Ex. 6 |
|---|---|---|---|---|---|---|---|---|
| First circumferential belt plies extending in inner regions R | No | Yes | Yes | Yes | Yes | Yes | Yes | Yes |
| L (mm) | 20 | 10 | 80 | 60 | 20 | 60 | 20 | 40 |
| Ratio La/TW | 0.25 | 0.30 | 0.25 | 0.25 | 0.30 | 0.20 | 0.20 | 0.40 |
| C/TW | 0.15 | 0.20 | 0.20 | 0.20 | 0.20 | 0.25 | 0.30 | 0.10 |
| Profile maintenance performance (score) | 80 | 100 | 100 | 100 | 95 | 95 | 100 | 100 |
| Wear resistance (score) | 80 | 100 | 100 | 95 | 100 | 100 | 95 | 100 |
| Tyre mass (score) | 2 | — | 3 | 3 | 2 | 3 | 3 | 1 |

TABLE 2

|  | Ex. 7 | Ex. 8 | Ex. 9 |
|---|---|---|---|
| Relationship between distances A and B | A > B | A > B | A < B |
| Relationship between ratios (A/C) and (B/D) | (A/C) > (B/D) | (A/C) < (B/D) | (A/C) < (B/D) |
| First circumferential belt plies extending in inner regions R | Yes | Yes | Yes |
| Ratio La/TW | 0.25 | 0.25 | 0.25 |
| Profile maintenance performance (score) | 95 | 100 | 100 |
| Wear resistance (score) | 95 | 98 | 100 |

As a result of the test, it is confirmed from Table 1 that the tyres of example have improved uneven wear resistance while suppressing an increase in tyre mass as compared with the tyres of the comparative example.

What is claimed is:

1. A tyre comprising:
 a tread portion being provided with a pair of shoulder circumferential grooves on an outer surface thereof and a tread reinforcing layer disposed in the tread portion, wherein
 the tread reinforcing layer comprises
  a circumferential belt layer having a plurality of first reinforcing cords oriented at an angle equal to or less than 5 degrees with respect to a tyre circumferential direction, and
  an inclined belt layer comprising a plurality of inclined belt plies having a plurality of second reinforcing cords arranged at an inclination angle in a range from 10 to 35 degrees with respect to the tyre circumferential direction,
 the circumferential belt layer comprises
  a pair of axially spaced first circumferential belt plies extending in radially inner regions of the pair of shoulder circumferential grooves, and
  a pair of axially spaced second circumferential belt plies that is superimposed on the pair of first circumferential belt plies via one or more inclined belt plies of the plurality of inclined belt plies,
 the pair of first circumferential belt plies is arranged apart from one another at a distance L equal to or more than 20 mm in a tyre axial direction,
 a pair of axially outermost ends of the pair of first circumferential belt plies is located axially inwardly of a pair of axially outermost ends of the inclined belt layer,
 each of the pair of second circumferential belt plies is located outwardly in the tyre axial direction with respect to a respective one of groove centerline positions of the pair of shoulder circumferential grooves, and
 the pair of second circumferential belt plies is located axially outwardly of inner regions of the pair of shoulder circumferential grooves such that the pair of second circumferential belt plies does not overlap with the inner regions of the pair of shoulder circumferential grooves.

2. The tyre according to claim 1, wherein each length in the tyre axial direction of the pair of first circumferential belt plies is smaller than the distance L.

3. The tyre according to claim 1,
 the tread portion being further provided with one or more crown circumferential grooves between the pair of shoulder circumferential grooves, wherein each inner edge in the tyre axial direction of the pair of first circumferential belt plies is located outwardly in the tyre axial direction of a respective one of the crown circumferential grooves.

4. The tyre according to claim 1, wherein
each of the pair of first circumferential belt plies comprises an outer portion located outwardly in the tyre axial direction of the respective shoulder circumferential groove centerline position, and an inner portion located inwardly in the tyre axial direction of the respective shoulder circumferential groove centerline position, and
a length A in the tyre axial direction of the outer portion is smaller than a length B in the tyre axial direction of the inner portion.

5. The tyre according to claim 4,
the tread portion being further provided with one or more crown circumferential grooves between the pair of shoulder circumferential grooves, thereby the tread portion comprising a pair of shoulder land portions located outwardly in the tyre axial direction of the pair of shoulder circumferential grooves, and a pair of crown land portions located inwardly in the tyre axial direction of the pair of shoulder circumferential grooves,
a ratio A/C of the length A in the tyre axial direction of each outer portion to a length C in the tyre axial direction of a respective one of the pair of shoulder land portions is smaller than a ratio B/D of the length B in the tyre axial direction of each inner portion to a length D in the tyre axial direction of a respective one of the pair of crown land portions.

6. The tyre according to claim 5, wherein the ratio A/C is in a range from 25% to 45%.

7. The tyre according to claim 5, wherein a length Lb in the tyre axial direction of the second circumferential belt plies is in a range from 0.30 to 0.50 times the length C of the shoulder land portions.

8. The tyre according to claim 4, wherein the length A is in a range of from 55% to 75% the length B.

9. The tyre according to claim 1, wherein the tyre is a heavy-duty vehicle tyre having an aspect ratio equal to or less than 65%.

10. The tyre according to claim 1, wherein the tread portion has a tread width equal to or more than 300 mm.

11. The tyre according to claim 1, wherein the pair of first circumferential belt plies is sandwiched between two adjacent inclined belt plies of the inclined belt layer.

12. The tyre according to claim 1, wherein the circumferential belt layer further comprises a central belt ply that is arranged between the pair of first circumferential belt plies and that is apart from the pair of first circumferential belt plies in the tyre axial direction.

13. The tyre according to claim 12, wherein a distance in the tyre axial direction between the central belt ply and a respective one of the first circumferential belt plies is equal to or more than 10 mm.

14. The tyre according to claim 1, wherein a pair of axially outermost ends of the pair of second circumferential belt plies is located axially inwardly of a pair of axially outermost ends of the inclined belt layer.

15. A tyre comprising:
a tread portion being provided with a pair of shoulder circumferential grooves on an outer surface thereof and a tread reinforcing layer disposed in the tread portion, wherein
the tread reinforcing layer comprises
a circumferential belt layer having a plurality of first reinforcing cords oriented at an angle equal to or less than 5 degrees with respect to a tyre circumferential direction, and
an inclined belt layer comprising a plurality of inclined belt plies having a plurality of second reinforcing cords arranged at an inclination angle in a range from 10 to 35 degrees with respect to the tyre circumferential direction,
the circumferential belt layer comprises
a pair of axially spaced first circumferential belt plies extending in radially inner regions of the pair of shoulder circumferential grooves, and
a pair of axially spaced second circumferential belt plies that is superimposed on the pair of first circumferential belt plies,
the pair of first circumferential belt plies is arranged apart from one another at a distance L equal to or more than 20 mm in a tyre axial direction,
a pair of axially outermost ends of the pair of first circumferential belt plies is located axially inwardly of a pair of axially outermost ends of the inclined belt layer, and
the pair of second circumferential belt plies is located axially outwardly of inner regions of the pair of shoulder circumferential grooves such that the pair of second circumferential belt plies does not overlap the inner regions of the pair of shoulder circumferential grooves.

16. A tyre comprising:
a tread portion being provided with a pair of shoulder circumferential grooves on an outer surface thereof and a tread reinforcing layer disposed in the tread portion, wherein
the tread reinforcing layer comprises
a circumferential belt layer having a plurality of first reinforcing cords oriented at an angle equal to or less than 5 degrees with respect to a tyre circumferential direction, and
an inclined belt layer comprising a plurality of inclined belt plies having a plurality of second reinforcing cords arranged at an inclination angle in a range from 10 to 35 degrees with respect to the tyre circumferential direction,
the circumferential belt layer comprises
a pair of axially spaced first circumferential belt plies extending in radially inner regions of the pair of shoulder circumferential grooves, and
a pair of axially spaced second circumferential belt plies that is superimposed on the pair of first circumferential belt plies via one or more inclined belt plies of the plurality of inclined belt plies,
the pair of first circumferential belt plies is arranged apart from one another at a distance L equal to or more than 20 mm in a tyre axial direction,
a pair of axially outermost ends of the pair of first circumferential belt plies is located axially inwardly of a pair of axially outermost ends of the inclined belt layer, and
the circumferential belt layer further comprises a central belt ply that is arranged between the pair of first circumferential belt plies and that is apart from the pair of first circumferential belt plies in the tyre axial direction.

* * * * *